Patented May 3, 1927.

1,627,351

UNITED STATES PATENT OFFICE.

ALEXANDER STEWART, OF ROSELLE, NEW JERSEY, ASSIGNOR TO C. L. CONSTANT COMPANY, OF HOBOKEN, NEW JERSEY, A CORPORATION OF NEW JERSEY.

PROCESS OF TREATING DISCARDED LEAD BATTERY PLATES.

No Drawing.   Application filed September 30, 1926.  Serial No. 138,810.

The invention relates to the treatment of discarded lead battery plates; and has reference more especially to the recovery therefrom of the metallic lead composing the same, or lead in the form of sulphate, or both, and the antimony present.

It is the present practice in connection with the recovery of these materials from waste of discarded battery plates to first separate the paste material—which comprises lead peroxide ($PbO_2$), lead sulphate ($PbSO_4$) and small amounts of antimony—from the grid portion, which consists of metallic lead alloyed with antimony, and then to subject the separated portions individually to various treatments in order to effect the desired recovery.

The present invention has for its object, however, to dispense entirely with such preliminary separation of the paste matter from its grid and to treat directly the waste or discarded plates with attached paste material. By the novel method of procedure hereinafter set forth, it is possible thus to obtain from the discarded plates substantially pure lead and lead sulphate, or solely lead sulphate, without first effecting a separation of the paste from the grid or lead portion of the plates.

To this end, the discarded battery plates are to be heated directly with a suitable salt in order to convert the lead peroxide of the paste portion thereof to a salt of the particular material employed, the metallic portion of the plates then being suitably removed therefrom. Or, the entire mass may be converted directly into substantially pure lead sulphate.

In the latter instance, the discarded lead plates are treated with nitre cake ($NaHSO_4$) in the proportion of from 1,000 lbs. to 2,000 lbs. of the nitre cake to each ton of the mixture of metal and paste material of the plates treated. This operation is best effected in a silica-lined furnace (not shown); and is carried to the point of complete fusion, whereupon the molten mass is poured into an aqueous solution of nitre cake of approximately 20% strength. By the foregoing treatment, the complete conversion of all of the lead to sulphate results as well as the conversion of any antimony present also to the sulphate form. Separation of antimony from the lead sulphate, if desired, may be effected, by the addition to the solution of sodium chloride, hydrochloric acid or some other suitable chloride of a metal which does not form an insoluble sulphate or chloride in the presence of an acid sulphate, for example, in the manner more particularly set forth in my co-pending application for U. S. Letters Patent, Serial #61,837.

Or, the molten mass consisting of lead sulphate and antimony sulphate instead of being poured into a cool aqueous solution of, for example, nitre cake and a suitable chloride, may be spray-cooled by well-known methods. In such case, the resulting powder product is to be treated in a hot solution of the sulphate and the sodium chloride, which solution must be maintained thoroughly hot and thoroughly agitated so that the solution will convert all of the antimony present to a soluble chloride. In either case, the antimony is then separated by allowing the lead sulphate to settle and decanting the supernatent liquor which contains the antimony in the form of the chloride $SbCl_3$ and the sulphate $Sb_2(SO_4)_3$.

Metallic antimony is recoverable from this salt by any of the usual treatments; and the lead sulphate remaining after the removal of this solution is to be washed a number of times, preferably by decantation, utilizing small amounts of sodium sulphate or acid sulphate and sodium chloride in the wash water to prevent, first, re-solution of the lead sulphate and, secondly, reprecipitation of any residual antimony as oxychloride.

In the event that the lead of the metallic portion is to be recovered as substantially pure metallic lead and the sulphate and peroxide of the paste portion as substantially pure sulphate with practical elimination of any antimony present in the original batch, the following procedure is carried out:

The original discarded plates are to be treated with common salt (NaCl) or potassium chloride (KCl), enough salt being added to combine with all of the lead peroxide present and it has been found that approximately 750 lbs. of salt to one ton of the plates is suitable. This mixture is then heated in a suitable furnace (not shown) until molten, the metallic portion from the plates, and constituting substantially pure lead, from time to time being tapped off in the usual manner from the bottom of the furnace.

The remaining slag which is a mixture of lead sulphate, lead chloride and antimony chloride is then poured in the molten-condition into a cooling receptacle and allowed to harden, whereupon it is disintegrated as by crushing and, if necessary, screened. Or, the same may be directly spray-cooled to a powder. This disintegrated slag material is then to be mixed with a sufficient quantity of nitre cake (sodium acid sulphate) to combine with the lead chloride to convert the same to sulphate. Equal parts of nitre cake and slag have been found to give satisfactory results; and the said mixture is roasted at a temperature approximating 275° C., which temperature is below the melting point of the sodium acid sulphate and the lead salts. It is, however, sufficiently high to volatilize the antimony chloride which may be recovered, in manner well understood, as by passing the vapors through a suitable condenser (not shown).

After the odor of hydrochloric acid has completely disappeared from the heated mixture, the temperature thereof is to be elevated until the mass becomes molten. Under the aforesaid treatments, the lead chloride is converted into the sulphate and in the molten condition is poured into a 20% aqueous solution of nitre cake. The said solution is then heated, agitated, filtered, or allowed to settle, and the supernatant liquid removed as by decantation. The residual lead sulphate is washed with a weak hot solution of nitre cake until free from impurities which, at this stage of the process, consist mainly of antimony as well as small amounts of iron, manganese, copper, etc. The total amount of these impurities, however, do not, as a rule, exceed 0.75% and are readily removed in the aforesaid manner and providing thus for substantially pure lead sulphate and lead from the original discarded plates comprising the metal portion and paste thereof.

I claim:

1. The process of treating discarded lead battery plates, which consists in heating to a molten condition the said plates directly with a dry salt capable of converting substantially all the peroxide of the paste portion thereof into a salt separable from the metallic portion of the plates.

2. The process of treating discarded lead battery plates, which consists in heating the plates with a dry chloride until molten, removing the molten metallic portion from the slag residue, disintegrating the latter, and roasting said disintegrated slag with sodium acid sulfate to volatilize any antimony salts.

3. The process of treating discarded lead battery plates, which consists in heating the plates with a dry chloride until molten, removing the molten metallic portion from the slag residue, disintegrating the latter, roasting said disintegrated slag with sodium acid sulfate to volatilize any antimony salts, then increasing the temperature to melt the mixture, and treating the molten mass with an aqueous solution of a sulphate of an alkali metal.

4. The process of treating discarded lead battery plates, which consists in heating until molten one ton of the discarded plate material with approximately 750 lbs. of sodium chloride, tapping off the metallic portion from the resulting slag portion, disintegrating the latter, roasting said disintegrated slag at a temperature of approximately 275° C. with an equal part of nitre cake and, after the odor of hydrochloric acid gas has disappeared, elevating the temperature of the mixture to an extent sufficient to melt the mixture, discharging the molten mass into a 20% solution of nitre cake in water, heating and agitating the same, and separating the residual lead sulphate therefrom.

5. The process of treating discarded lead battery plates, which consists in heating until molten one ton of the discarded plate material with approximately 750 lbs. of sodium chloride, tapping off the metallic portion from the resulting slag portion, disintegrating the latter, roasting said disintegrated slag at a temperature of approximately 275° C. with an equal part of nitre cake and, after the odor of hydrochloric acid gas has disappeared, elevating the temperature of the mixture to an extent sufficient to melt the mixture, discharging the molten mass into a 20% solution of nitre cake in water, heating and agitating the same, separating the residual lead sulphate therefrom, and washing the latter with a weak hot solution of nitre cake until substantially free from impurities.

6. The method of eliminating antimony from a mixture of lead sulphate, lead chloride and antimony chloride, which consists in heating said mixture with sodium acid sulfate to a temperature sufficient to volatilize the antimony chloride.

7. The method of eliminating antimony from a mixture of lead sulphate, lead chloride and antimony chloride, which consists in heating said mixture with an equal portion of nitre cake to a temperature of approximately 275° C.

In testimony whereof I affix my signature.

ALEXANDER STEWART.